(12) United States Patent
Saito

(10) Patent No.: US 10,073,928 B2
(45) Date of Patent: Sep. 11, 2018

(54) METHOD AND DEVICE FOR ANALYSIS OF SHAPE OPTIMIZATION

(71) Applicant: JFE Steel Corporation, Tokyo (JP)

(72) Inventor: Takanobu Saito, Tokyo (JP)

(73) Assignee: JFE Steel Corporation (JP)

( * ) Notice: Subject to any disclaimer, the term of this patent is extended or adjusted under 35 U.S.C. 154(b) by 318 days.

(21) Appl. No.: 14/758,372

(22) PCT Filed: Dec. 20, 2013

(86) PCT No.: PCT/JP2013/084367
§ 371 (c)(1),
(2) Date: Jun. 29, 2015

(87) PCT Pub. No.: WO2014/119176
PCT Pub. Date: Aug. 7, 2014

(65) Prior Publication Data
US 2016/0004793 A1 Jan. 7, 2016

(30) Foreign Application Priority Data
Feb. 1, 2013 (JP) .................................. 2013-018676

(51) Int. Cl.
*G06F 17/50* (2006.01)

(52) U.S. Cl.
CPC .......... *G06F 17/50* (2013.01); *G06F 17/5018* (2013.01); *G06F 17/5095* (2013.01); *G06F 2217/08* (2013.01); *Y02T 10/82* (2013.01)

(58) Field of Classification Search
CPC .. G06F 17/50; G06F 17/5018; G06F 17/5095; G06F 2217/08; Y02T 10/82
See application file for complete search history.

(56) References Cited

U.S. PATENT DOCUMENTS

| | | | | |
|---|---|---|---|---|
| 6,044,210 A | * | 3/2000 | Nagtegaal | G06F 17/5018 703/2 |
| 7,702,490 B1 | * | 4/2010 | Wu | G06F 17/5018 703/2 |

(Continued)

FOREIGN PATENT DOCUMENTS

| | | |
|---|---|---|
| CN | 1829993 | 9/2006 |
| CN | 102201017 | 9/2011 |
| JP | 2010-250818 A | 11/2010 |

OTHER PUBLICATIONS

Kang et al, Optimization of flexible multibody dynamic systems using the equivalent static load method, AIAA Journal vol. 43 No. 4 Apr. 2005. p. 846-855.*

(Continued)

*Primary Examiner* — Aniss Chad
*Assistant Examiner* — Chuen-Meei Gan
(74) *Attorney, Agent, or Firm* — DLA Piper LLP (US)

(57) ABSTRACT

A method for analysis of shape optimization includes: setting, as a design space, a portion to be optimized in a movable portion; generating, in the set design space, an optimization block model formed of three-dimensional elements and is to be subjected to analysis processing of optimization; connecting the generated optimization block model with a structural body model; setting a material property for the optimization block model; setting an optimization analysis condition for finding an optimum shape of the optimization block model; setting a multi-body dynamics analysis condition for performing multi-body dynamics analysis on the structural body model with which the optimization block model has been connected; and executing, based on the set optimization analysis condition and multi-body dynamics analysis condition, the multi-body dynamics (Continued)

analysis on the optimization block model and finding the optimum shape of the optimization block model.

13 Claims, 15 Drawing Sheets

(56) References Cited

U.S. PATENT DOCUMENTS

| | | | | |
|---|---|---|---|---|
| 8,942,963 | B1* | 1/2015 | Kanthasamy | G06F 17/5009 703/6 |
| 9,323,869 | B1* | 4/2016 | Kanthasamy | G06F 17/50 |
| 2002/0016697 | A1* | 2/2002 | Nishigaki | G06F 17/5018 702/183 |
| 2005/0055183 | A1* | 3/2005 | Tani | G06F 17/5018 703/2 |
| 2006/0114252 | A1* | 6/2006 | Ramani | G06F 17/30277 345/419 |
| 2006/0259283 | A1* | 11/2006 | Brughmans | G06F 17/5018 703/2 |
| 2007/0293967 | A1* | 12/2007 | Sasaki | B65D 81/053 700/98 |
| 2008/0312880 | A1* | 12/2008 | McLuckie | G05B 17/02 703/1 |
| 2009/0164178 | A1* | 6/2009 | Pydimarry | G06F 17/50 703/1 |
| 2010/0058257 | A1* | 3/2010 | Park | G06F 17/50 716/132 |
| 2010/0262406 | A1* | 10/2010 | Goel | G06F 17/5018 703/2 |
| 2011/0137443 | A1* | 6/2011 | Farahani | G06F 17/5009 700/98 |

OTHER PUBLICATIONS

Pereira et al, Crashworthiness analysis and design using regid-flexible multibody dynamics with applcation to train vehocles, International Journal for Numerical Methods in Engineering, vol. 40, 655-687 (1997).*
Ahmed Shabana, Flexible multibody dynamics: review of past and recent developments, Multibody System Dynamics 1: 189-222, 1997.*
Wasfy et al, Computational strategies for flexible multibody systems, Appl Mech Rev vol. 56 No. 6 Nov. 2003 p. 553-613.*
Xu et al, Modeling and analysis of planar multibody systems containing deep groove ball bearing with clearance, Mechnism and machine theory 56 (2012) 69-88.*
Extended European Search Report dated Aug. 26, 2016, from corresponding European Application No. 13874153.3.
Yamada, T. et al., "A Topology Optimization Method Based on the Level Set Method Incorporating a Fictitious Interface Energy," *Comput. Methods Appl. Mech. Engrg.*, 2010, vol. 199, pp. 2876-2891.
Müller, O. et al., "Topology Optimization of Large Real World Structures", (online), Mar. 3, 2007, pp. 1-14, http://web.archive.org/web/20070303133506/http://www.ipek.uni-karlsruhe.de/medien/veroeffentlichungen/nafems99/nafems_paper.pdf.
Yuge, K. et al., "Design of Structural Members for Crashworthiness Using Three Dimensional Topology Optimization", *Transactions of the Japan Society of Mechanical Engineers* (Series A), Nov. 25, 2003, vol. 69, No. 687, pp. 93-100.
Fujii, D. et al., "Optimum Reinforcement of Void Slab by CFRP Using Topology Optimization Method", *Journal of Structural and Construction Engineering*, Architectural Institute of Japan, Nov. 30, 2004, No. 585, pp. 109-114.
Japanese Notice of Rejection dated Apr. 30, 2014 of corresponding Japanese Application No. 2013-018676 with partial English translation.
Office Action dated Aug. 2, 2017, from corresponding Chinese Application No. 201380071754.X, along with an English translation of the Search Report.
Cui, Xintao, "Methods for Lightweight Automotive Body Design Using Multi-material Construction," *China Doctoral Dissertations,. Engineering Technology*, Edition II, issue 4, Apr. 15, 2009, along with an Abstract in English on pp. III and IV.

* cited by examiner (STATE A1)

(STATE A2)

(STATE A3)

(STATE A4)

CENTRAL INNER PORTION

METHOD AND DEVICE FOR ANALYSIS OF SHAPE OPTIMIZATION

TECHNICAL FIELD

This disclosure relates to a method and a device for analysis of shape optimization of a structural body, the method and device being for, for example, increasing stiffness of an automotive structural body of an automobile or the like, and realizing weight reduction of the automotive body, or to improve crash worthiness thereof and realizing weight reduction thereof. "Shape optimization" referred to in this specification does not mean finding an optimum shape on the premise of a predetermined shape (for example, a T-shape) by supposing that predetermined shape beforehand, but means finding the most preferred shape satisfying analysis conditions without supposing a predetermined shape.

BACKGROUND

In recent years, weight reduction of full vehicles arising from environmental problems has been advanced, in particular in the automotive industry, and analysis by computer aided engineering (hereinafter, referred to as "CAE (computer aided engineering) analysis") has become an indispensable technique in designing automotive bodies. This CAE analysis has been known to achieve improvement in stiffness and weight reduction by using an optimization technique such as mathematical optimization, sheet thickness optimization, shape optimization, or topology optimization. For example, the optimization technique of the CAE analysis is often used in structural optimization of castings such as engine blocks. Of those optimization techniques of the CAE analysis, topology optimization, in particular, has started to attract attention.

Topology optimization is a method of providing a design space of a certain size, fitting three-dimensional elements in the design space, and leaving a minimum necessary portion of the three-dimensional elements satisfying given conditions, to thereby obtain an optimum shape satisfying the conditions. Therefore, for topology optimization, a method of directly constraining the three-dimensional elements forming the design space and directly adding a load thereon is used. As a technique related to such topology optimization, a method of topology optimization of a component of a complex structural body is disclosed in Japanese Patent Application Publication No. 2010-250818.

Structural bodies of automobiles and the like are configured by using mainly thin sheets, and when a portion of an automotive body formed of such a thin sheet is optimized, it is difficult to cause that portion to be independent as a design space and to reflect a load and a constrained state in that design space. Thus, there has been a problem that it is difficult to apply an optimization technique to a part of a structural body. Further, there has also been a problem of how to reflect an optimized shape in a thin sheet structure appropriately even if the optimized shape is found with three-dimensional elements.

The technique disclosed in Japanese Patent Application Publication No. 2010-250818 relates to a method of using mathematical operations and to a physical system for analysis, and does not provide any means of solving the above mentioned problems. In recent years, development of a technique to solve the above mentioned problems has been desired.

It could therefore be helpful to provide a technique that enables application of an optimization technique to a part of a structural body that receives external force and that contributes to optimization of the structural body.

SUMMARY

I thus provide:

A method of optimizing a part of a structural body model including a movable portion, by using two-dimensional elements or three-dimensional elements, and the method includes: a design space setting step of setting, as a design space, a portion to be optimized in the movable portion; an optimization block model generating step of generating, in the set design space, an optimization block model that is formed of three-dimensional elements and is to be subjected to analysis processing of optimization; a connection processing step of connecting the generated optimization block model with the structural body model; a material property setting step of setting a material property for the optimization block model; an optimization analysis condition setting step of setting an optimization analysis condition for finding an optimum shape of the optimization block model; a multi-body dynamics analysis condition setting step of setting a multi-body dynamics analysis condition for performing multi-body dynamics analysis on the structural body model with which the optimization block model has been connected; and an optimum shape analyzing step of executing, based on the set optimization analysis condition and multi-body dynamics analysis condition, the multi-body dynamics analysis on the optimization block model and finding the optimum shape of the optimization block model.

In the multi-body dynamics analysis condition setting step, a load or displacement that is obtained as a result of performing multi-body dynamics analysis on the structural body model beforehand is set.

In the material property setting step, at a time a part where the optimization block model has been connected in the structural body model is formed of two-dimensional elements, a Young's modulus in the three-dimensional elements of the optimization block model is set lower than a Young's modulus in the two-dimensional elements.

The three-dimensional elements forming the optimization block model are each formed of a three-dimensional element that is a polyhedron having five to eight sides and that has at least one pair of sides parallel to each other.

In the optimization block model generating step, the optimization block model, which is along a peripheral surface where the design space has been set in the structural body model, and in which the three-dimensional elements are subdivided in parallel with a plane having a maximum area of the design space, is generated.

The optimization block model is generated by: setting nodes in a portion connected with the two-dimensional elements or three-dimensional elements forming the structural body model; using, as the three-dimensional elements forming the optimization block model, hexahedral three-dimensional elements; and stacking the three-dimensional elements along a plane including the nodes set in the connected portion.

The optimization block model is formed of a plurality of block bodies formed of three-dimensional elements, and is formed by connecting the plurality of block bodies by using a rigid body element, a beam element, or a two-dimensional element.

Discretization is performed with an optimization parameter in optimization calculation by numerical analysis.

A device for analysis of shape optimization is a device for analysis of shape optimization of optimizing a part of a structural body model having a movable portion, by using two-dimensional elements or three-dimensional elements, and the device includes: a design space setting unit that sets, as a design space, a portion to be optimized in the movable portion; an optimization block model generating unit that generates, in the set design space, an optimization block model that is formed of three-dimensional elements and is subjected to analysis processing of optimization; a connection processing unit that connects the generated optimization block model with the structural body model; a material property setting unit that sets a material property for the optimization block model; an optimization analysis condition setting unit that sets an optimization analysis condition for finding an optimum shape of the optimization block model; a multi-body dynamics analysis condition setting unit that sets a multi-body dynamics analysis condition for performing multi-body dynamics analysis on the structural body model with which the optimization block model has been connected; and an optimum shape analyzing unit that executes, based on the set optimization analysis condition and multi-body dynamics analysis condition, the multi-body dynamics analysis on the optimization block model and finds the optimum shape of the optimization block model.

The multi-body dynamics analysis condition setting unit sets a load or displacement that is obtained as a result of performing multi-body dynamics analysis on the structural body model beforehand.

At a time a part where the optimization block model has been connected in the structural body model is formed of two-dimensional elements, the material property setting unit sets a Young's modulus in the three-dimensional elements of the optimization block model lower than a Young's modulus in the two-dimensional elements.

The three-dimensional elements forming the optimization block model are each formed of a three-dimensional element that is a polyhedron having five to eight sides and that has at least one pair of sides parallel to each other.

The optimization block model generating unit generates the optimization block model, which is along a peripheral surface where the design space has been set in the structural body model, and in which the three-dimensional elements are subdivided in parallel with a plane having a maximum area of the design space.

The optimization block model generating unit performs the generation by: setting nodes in a portion connected with the two-dimensional elements or three-dimensional elements forming the structural body model; using, as the three-dimensional elements forming the optimization block model, hexahedral three-dimensional elements; and stacking the three-dimensional elements along a plane including the nodes set in the connected portion.

The optimization block model generating unit forms the optimization block model with a plurality of blocks formed of three-dimensional elements, and generates the optimization block model by connecting the plurality of blocks by using a rigid body element, a beam element, or a two-dimensional element.

The optimum shape analyzing unit performs discretization with an optimization parameter in optimization calculation by numerical analysis.

The optimum shape analyzing unit performs optimization calculation by topology optimization.

I enable application of an optimization technique to a part of a structural body, which receives external force, achieving optimization of the structural body such as an automotive body, and thereby realizing weight reduction of the structural body while improving stiffness and crash worthiness in a movable portion of the structural body.

REFERENCE SIGNS LIST

1 Device For Analysis Of Shape Optimization
3 Display Device
5 Input Device
7 Memory Storage
9 Working Data Memory
9a Data Storage Area
9b Working Area
11 Arithmetic Processing Unit
12 Door Frame
13 Structural Body Model
14 Door
14a Outer Part
14b Inner Part
14d Hinge Portion
15 Design Space Setting Unit
17 Optimization Block Model Generating Unit
19 Connection Processing Unit
20 Material Property Setting Unit
21 Optimization Analysis Condition Setting Unit
22 Multi-Body Dynamics Analysis Condition Setting Unit
23 Optimum Shape Analyzing Unit
25 Design Space
27 Optimization Block Model
27a Upper Block
27b Lower Block
29 Connected Portion
33 Reference Plane
33a Reference Plane
33b Reference Plane
35 Step
41 Door Model
41b Inner Part
41c Hinge Portion
43 Shaft

DETAILED DESCRIPTION

Hereinafter, preferred examples of a method and a device for analysis of shape optimization will be described in detail, based on the drawings. This disclosure is not limited by these examples.

First Example

Figure 1:
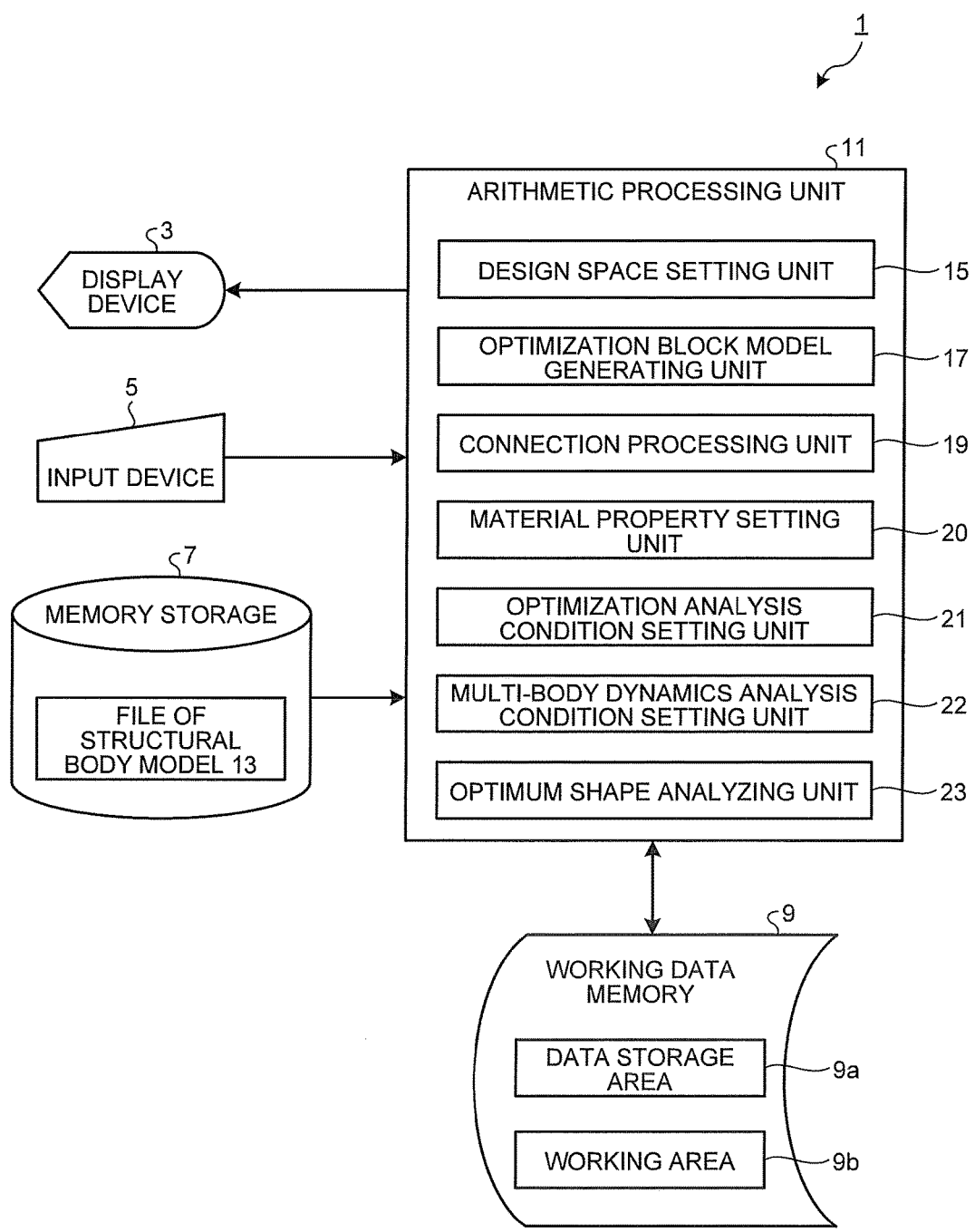
FIG. 1 is a block diagram of a device for analysis of shape optimization according to a first example.
Figure 2:
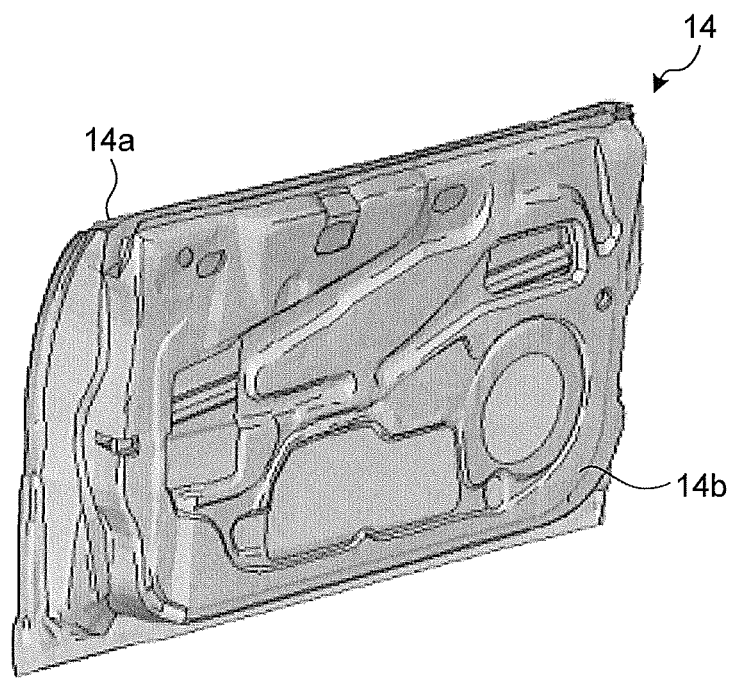
FIG. 2 is an explanatory diagram of a movable portion (door) of a structural body model according to the first example.

A device for analysis of shape optimization 1 according to this first example is a device in which a computer optimizes, according to an instruction of an operator, a portion of a structural body model having a movable part, by using two-dimensional elements and three-dimensional elements as appropriate. Specifically, the device for analysis of shape optimization 1 according to this first example is a device that performs optimization calculation by numerical analysis of a shape of a part of a structural body model 13 (see FIG. 3) formed by using two-dimensional elements, of which an example is illustrated in FIG. 2, or two-dimensional elements and three-dimensional elements. This device for analysis of shape optimization 1 is, as illustrated in FIG. 1, configured of a personal computer (PC), and has a display device 3, an input device 5, a memory storage 7, a working data memory 9, and an arithmetic processing unit 11. Further, the display device 3, the input device 5, the memory storage 7, and the working data memory 9 are connected to the arithmetic processing unit 11. The display device 3, the input device 5, the memory storage 7, and the working data memory 9 respectively perform functions according to commands of the arithmetic processing unit 11.

Display Device

The display device 3 is used in display of results of calculation and the like, and is configured of a liquid crystal monitor, or the like.

Input Device

The input device 5 is used in instruction for display of a structural body model file, input of conditions by the operator, and the like, and is configured of a key board, a mouse, and the like.

Memory Storage

Figure 3:
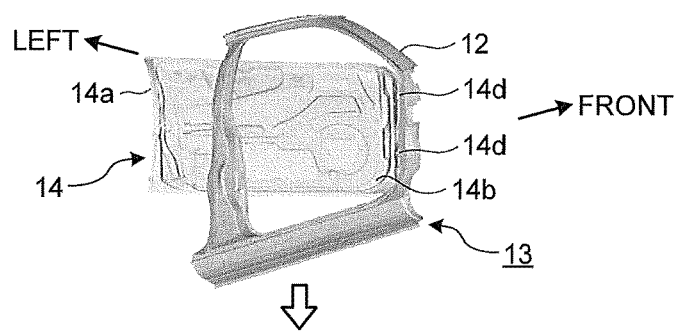
FIG. 3 is an explanatory diagram illustrating an operation of the movable portion (door) of the structural body model according to the first example.
Figure 3:
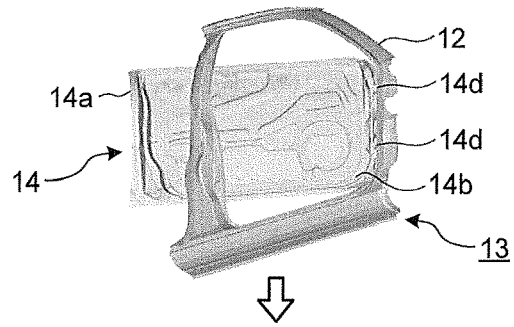
Figure 3:
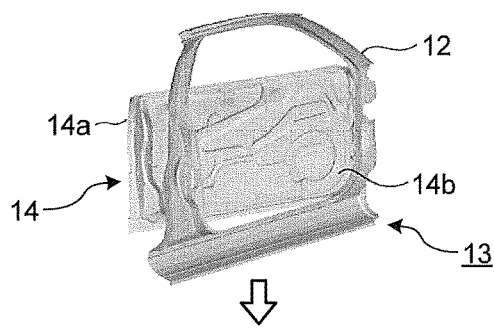
Figure 3:
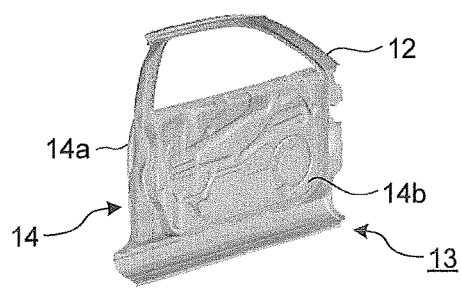

In the memory storage 7, various pieces of information such as a file of the structural body model 13 exemplified in FIG. 3, are stored. The structural body model 13 may be formed of only two-dimensional elements, or may be formed of a combination of two-dimensional elements and three-dimensional elements. For example, in an example of a door 14 of an automobile as illustrated in FIG. 2 as an example of the structural body model 13, an outer part 14a forming the automobile's outer side of the door 14 is formed mainly of a steel sheet and thus the structural body model 13 is formed of two-dimensional elements. Further, if the structural body model 13 is a block body formed of a casting such as an engine, for example, the structural body model 13 is formed of three-dimensional elements.

Working Data Memory

The working data memory 9 has, inside thereof, a data storage area 9a storing therein results of calculation, and a working area 9b for performing calculation processing.

Arithmetic Processing Unit

The arithmetic processing unit 11 is configured of a central processing unit (CPU) of a computer such as a personal computer (PC). Each unit of the arithmetic processing unit 11 described below is realized by the CPU of the PC executing a predetermined program. The arithmetic processing unit 11 includes: a design space setting unit 15 that sets, as a design space, a portion to be optimized in a movable portion; an optimization block model generating unit 17 that generates, in the set design space, an optimization block model 27 (see FIG. 4B and the like), which is formed of three-dimensional elements and is to be subjected to analysis processing of optimization; a connection processing unit 19 that connects the generated optimization block model 27 with the structural body model 13; a material property setting unit 20 that sets a material property for the optimization block model 27; an optimization analysis condition setting unit 21 that sets a condition (referred to as "optimization analysis condition") for finding an optimum shape for the optimization block model 27; a multi-body dynamics analysis condition setting unit 22 that sets a condition (referred to as "multi-body dynamics analysis condition") for performing multi-body dynamics analysis on the structural body model 13 (see FIG. 8) connected with the optimization block model 27; and an optimum shape analyzing unit 23 that executes, based on the set optimization analysis condition and multi-body dynamics analysis condition, multi-body dynamics analysis on the optimization block model 27 and finds an optimum shape of the optimization block model 27.

A configuration of each of the units of the arithmetic processing unit 11 will be described in detail. In the description, the structural body model 13, which is formed of a door frame 12 (see FIG. 3) and the door 14 (see FIG. 2 and FIG. 3) at a front left side of an automotive body (not illustrated), will be exemplified. Further, the door 14 is also a movable portion of the structural body model 13.

FIG. 2 is an explanatory diagram of the movable portion of the structural body model according to the first example. FIG. 2 illustrates a perspective view of the door 14, which is an example of the movable portion of this structural body model 13 from the automobile's inner side. As illustrated in FIG. 2, the door 14 has the outer part 14a, which is provided on the automobile's outer side and is sheet-like, and an inner part 14b, which is provided on the automobile's inner side. Further, the door 14 has: a reinforcement part (not illustrated), which is provided between the outer part 14a and inner part 14b and reinforces the door 14; and a hinge portion 14d (see FIG. 3), which is provided on a lateral surface of a front side of the automotive body and is for coupling the door 14 to the door frame 12.

The door 14 is rotatably attached to the door frame 12 with the hinge portion 14d and pivots about the hinge portion 14d as illustrated by state A1 to state A4 of FIG. 3. In this way, the door 14 is opened and closed. FIG. 3 is a diagram illustrating an operation of closing the door 14. In FIG. 3, the state A1 illustrates an open state of the door 14. The state A2 and state A3 illustrate a process of the door 14 being brought from the open state into a closed state. The state A4 illustrates the closed state of the door 14. If the door 14 is closed with great force, the outer part 14a may be deformed due to a centrifugal force, a reaction force upon the closure of the door 14, or the like. Thus, in this example, investigation is made on optimizing a shape of the inner part 14b to minimize the deformation of the outer part 14a upon the closure of the door 14 while achieving weight reduction of the door 14.

Design Space Setting Unit

Figure 4A:
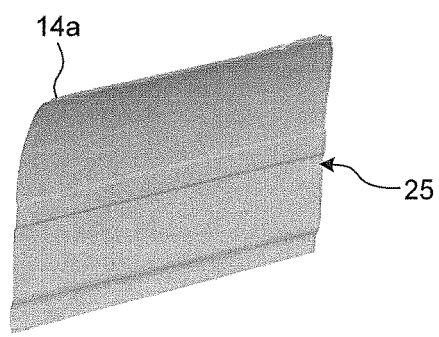
FIG. 4A is a diagram illustrating a process of setting a design space in a method for analysis of shape optimization according to the first example.
Figure 4B:
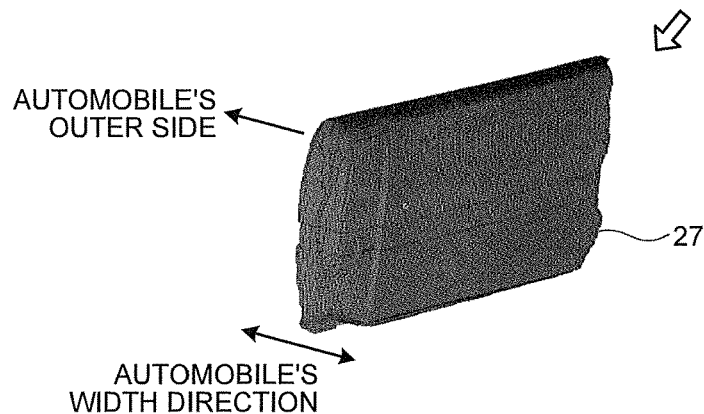
FIG. 4B is a diagram illustrating a process of generating an optimization block model in the method for analysis of shape optimization according to the first example.
Figure 4C:
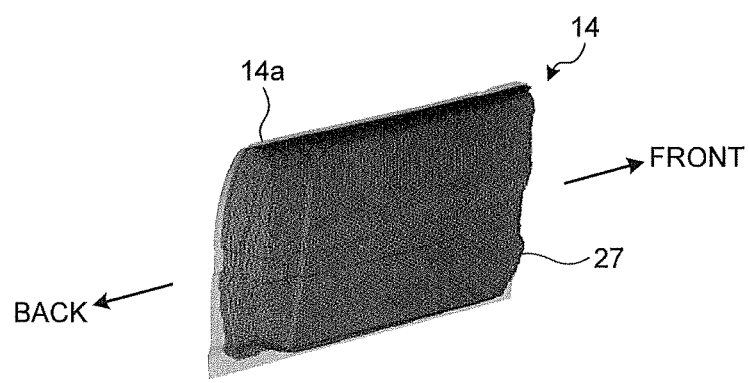
FIG. 4C is a diagram illustrating a process of connecting an optimization block model in the method for analysis of shape optimization according to the first example.

The design space setting unit 15 sets, as a design space 25, a portion to be optimized, in a portion of the movable portion of the structural body model 13. In this first example, the design space setting unit 15 has set, as the design space 25, a portion of the door 14 illustrated in FIG. 2, other than the outer part 14a. FIG. 4A to FIG. 4C are diagrams illustrating a method for analysis of optimization of the door 14, which is an example of the movable portion of the structural body model according to the first example. FIG. 4A is a diagram illustrating a process of setting a design space in a method for analysis of shape optimization according to the first example. FIG. 4B is a diagram illustrating a process of generating an optimization block model in the method for analysis of shape optimization according to the first example. FIG. 4C is a diagram illustrating a process of connecting the optimization block model in the method for analysis of shape optimization according to the first example. When the design space 25 is set in a part of the movable portion of the structural body model 13 by the design space setting unit 15, as illustrated in FIG. 4A, the inner part 14b (FIG. 2), which is a part of the structural body model 13 in that part, is deleted, and the deleted part becomes the design space 25. FIG. 4A illustrates a state with only the outer part 14a.

The above described example corresponds to when the design space setting unit 15 sets the design space 25 by deleting a part of the structural body model 13, but the device for analysis of shape optimization 1 may be configured to set the design space 25 beforehand upon generation of the structural body model 13. If the design space 25 is set beforehand upon generation of the structural body model 13, a generating unit itself that generates the structural body model 13 serves also as the design space setting unit 15. That is, the design space setting unit 15 may have both of the above described function of setting a design space and function of generating a structural body model.

Optimization Block Model Generating Unit

Figure 5A:
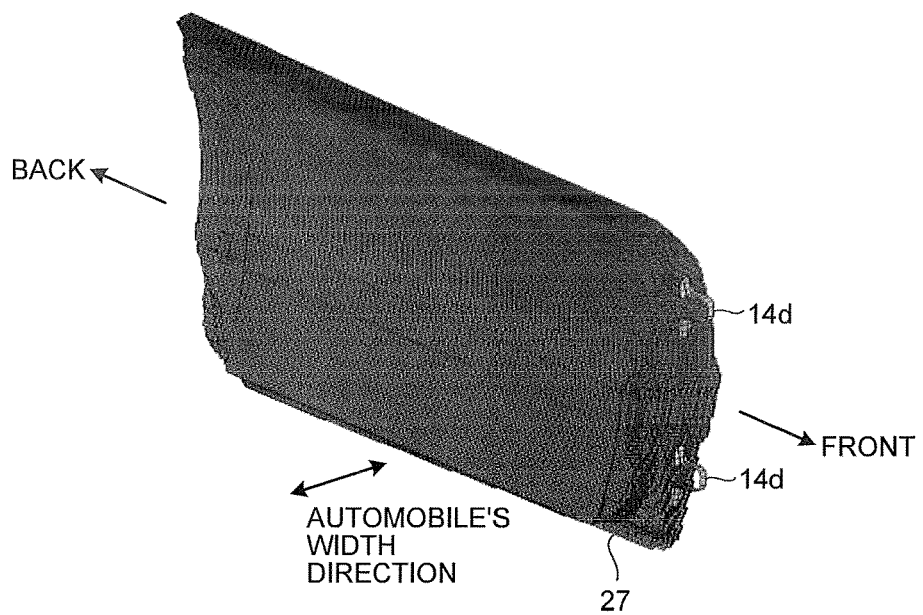
FIG. 5A is an explanatory diagram illustrating elements inside the optimization block model in the first example.
Figure 5B:
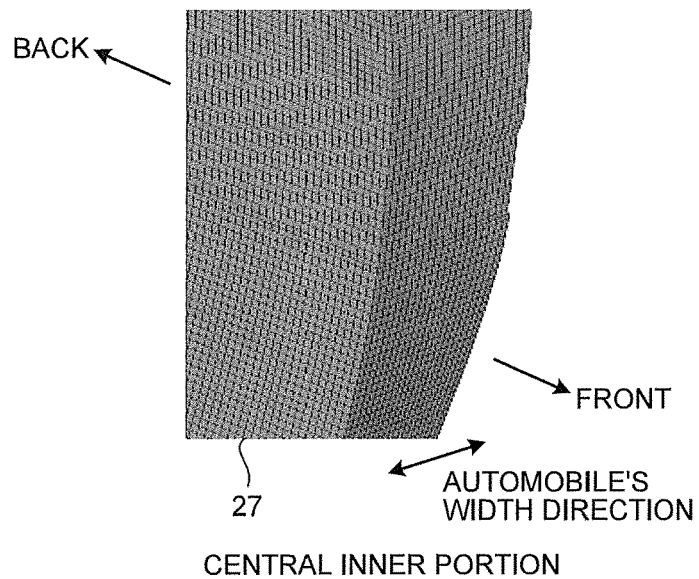
FIG. 5B is an enlarged view illustrating the inside of the optimization block model illustrated in FIG. 5A.

The optimization block model generating unit 17 generates the optimization block model 27 that performs analysis processing of optimization on the set design space 25. Upon generation, the optimization block model generating unit 17 may generate the optimization block model 27 in any shape of a size that fits in the set design space 25. FIG. 4B, FIG. 5A, and FIG. 5B illustrate an example in which the optimization block model 27 has been generated in the design space 25. FIG. 5A and FIG. 5B are explanatory diagrams illustrating elements inside the optimization block model according to the first example. FIG. 5A illustrates a state where the optimization block model 27 illustrated in FIG. 4B is viewed from a direction of a thick arrow in FIG. 4B. FIG. 5B is an enlarged view of inside of the optimization block model 27 illustrated in FIG. 5A at its front-back direction central portion.

Further, the optimization block model generating unit 17 forms the optimization block model 27 with three-dimensional elements. Upon formation, the optimization block model generating unit 17 preferably forms the three-dimensional elements each with a three-dimensional element, which is a polyhedron having five sides or more and eight sides or less and which has at least one pair of sides parallel to each other. Reasons are as follows. If a part formed in the design space 25 is formed of a thin sheet like a part of an automotive body, an optimum shape of the optimization block model 27 is desirably calculated to be reflected in a structural body shape of the thin sheet, by executing calculation of optimization using the optimization block model 27. In this respect, by forming the optimization block model 27 by using the three-dimensional elements, which are polyhedrons each having five sides or more and eight sides or less and which have at least one pair of sides parallel to each other, such a demand becomes easier to be satisfied. Further, accuracy of optimization is preferably increased by setting as the three-dimensional elements of polyhedrons each having five sides or more forming the optimization block model 27, three-dimensional elements of a uniform size. In this first example, as illustrated in FIG. 5B, the whole optimization block model 27 is formed of hexahedral elements.

Further, the optimization block model generating unit 17 preferably generates the optimization block model 27, along a peripheral surface where the design space 25 has been set in the structural body, and such that the three-dimensional elements are subdivided in parallel with a plane having the maximum area of the design space 25. For example, as illustrated in FIG. 4A, if the inner part 14b in the door 14 is set as the design space 25, as illustrated in FIG. 4B, a surface of this optimization block model 27 on the automobile's outer side has the maximum area. The optimization block model generating unit 17 generates the optimization block model 27 such that the surface on the automobile's outer side, which has this maximum area, becomes parallel to a lateral surface of the automotive body.

Reasons to generate the optimization block model 27 as described above are as follows. Since the inner part 14b is formed of a sheet, for example, a calculation result in which the three-dimensional elements of the optimization block model 27 remain in a two-dimensional shape is desirably obtained when calculation of optimization is executed by using the optimization block model 27. By adopting the above described model configuration for the optimization block model 27, possibility of this result of calculation remaining in a two-dimensional shape is increased and thus utility value for practical use is increased.

Connection Processing Unit

Figure 6:
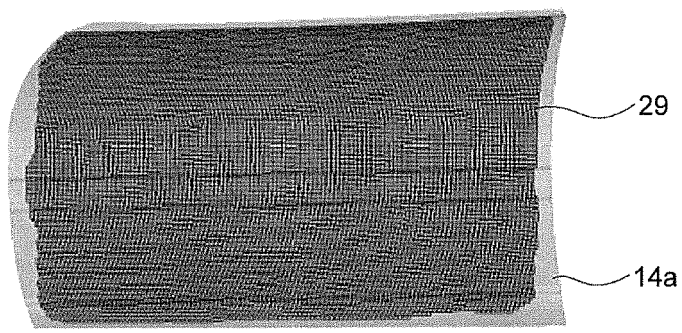
FIG. 6 is an explanatory diagram illustrating a connected position of the optimization block model according to the first example.
Figure 7:
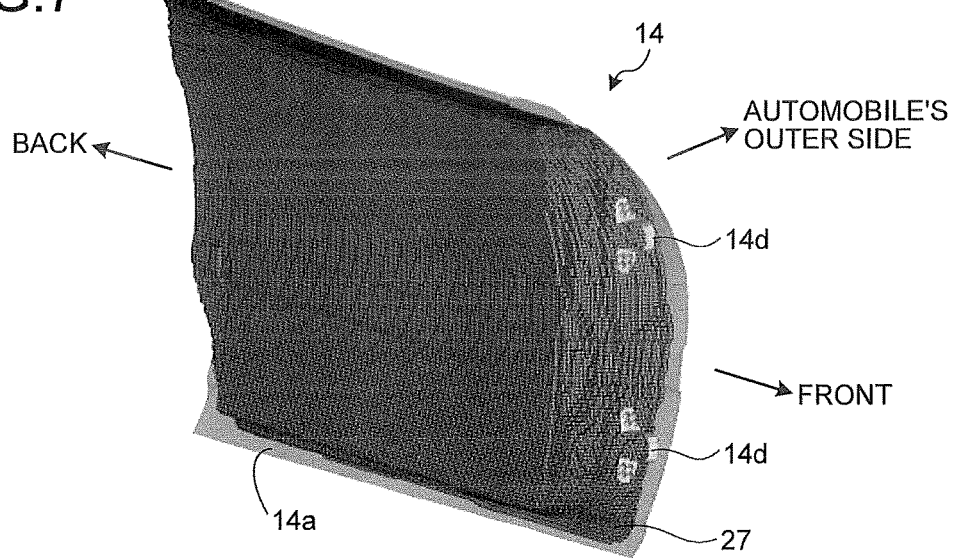
FIG. 7 is an explanatory diagram illustrating another example of a connected position of the optimization block model according to the first example.

The connection processing unit 19 performs processing to connect the generated optimization block model 27 with the structural body model 13 (outer part 14a and hinge portion 14d). In this processing of connecting the optimization block model 27 and structural body model 13 together, a rigid body element, a sheet element, or a beam element is used. To accurately transmit a load between the optimization block model 27 and outer part 14a, the connection processing unit 19 preferably performs connection processing such that the original connection between the part deleted as the design space 25 and the outer part 14a is reflected in a connected position between the optimization block model 27 and outer part 14a. FIG. 6 is an explanatory diagram illustrating a connected position of the optimization block model according to the first example. FIG. 6 illustrates, as an example of the connected position of the optimization block model 27, a connected portion 29 between a surface of the outer part 14a on the automobile's inner side and the optimization block model 27 illustrated in FIG. 4C and the like. The connection processing unit 19 has connected the outer part 14a with the optimization block model 27 at the connected portion 29 illustrated in FIG. 6 with their surfaces. As a result, an optimum shape of the inner part 14b illustrated in FIG. 2 and the like and an optimum connection between the outer part 14a and inner part 14b are able to be analyzed. FIG. 7 is an explanatory diagram illustrating another example of a connected position of the optimization block model according to the first example. FIG. 7 illustrates, as another example of a connected position of the optimization block model 27, a connected portion between the optimization block model 27 and hinge portion 14d. In this first example, the hinge portion 14d is, as illustrated in FIG. 7, formed of two-dimensional elements. The connection processing unit 19 has connected the optimization block model 27 and hinge portion 14d as illustrated in FIG. 4C.

Material Property Setting Unit

The material property setting unit 20 sets, for the optimization block model 27, material properties such as a Young's modulus, a specific gravity, a yield strength, and a tensile strength. Three-dimensional elements are more difficult to be deformed than two-dimensional elements. Thus, if a model to be analyzed is formed by connecting three-dimensional elements and two-dimensional elements together, a part formed of the two-dimensional elements may be largely deformed, leading to a result of analysis different from the actual state. For example, if a connected part between the optimization block model 27 and structural body model 13 is formed of two-dimensional elements, when a load is applied to the optimization block model 27, the position of the connected part is deformed more largely than the optimization block model 27, contrary to the actual state. To solve such a problem, if the part where the optimization block model 27 is connected to in the structural body model 13 is formed of two-dimensional elements as described above, the material property setting unit 20 sets Young's modulus of the three-dimensional elements of the optimization block model 27 lower than (for example, to be equal to or less than a half of) a Young's modulus of the two-dimensional elements. As a result, analysis that has no bias in deformation and that is well-balanced is able to be performed.

Optimization Analysis Condition Setting Unit

The optimization analysis condition setting unit 21 sets an optimization analysis condition to find an optimum shape of the optimization block model 27. There are two types of the optimization analysis conditions set by this optimization analysis condition setting unit 21, which are objective conditions and constraint conditions. The objective condition is a condition set according to an object of the structural body model 13. Examples of this objective condition include, minimizing displacement, minimizing strain energy, minimizing generated stress, maximizing absorbed energy, and the like. The optimization analysis condition setting unit 21 sets only one objective condition for the optimization block model 27. The constraint condition is a constraint imposed upon optimization analysis. Examples of the constraint condition include a material volume fraction, which is a volume ratio of a volume of the optimization block model 27 after optimization to a volume of the optimization block model 27 before the optimization, displacement of an arbitrary portion, a generated stress, and the like. The optimization analysis condition setting unit 21 is able to set a plurality of constraint conditions for the optimization block model 27.

Multi-Body Dynamics Analysis Condition Setting Unit

The multi-body dynamics analysis condition setting unit 22 sets a multi-body dynamics analysis condition to perform multi-body dynamics analysis on the structural body model 13 that has been connected with the optimization block model 27. When a deformation of the outer part 14a in an operation of closing the door 14 is analyzed, for example, the multi-body dynamics analysis condition setting unit 22 rotatably sets the door 14 to the door frame 12 with the hinge portion 14d and sets a position of the door 14 at the start of analysis, a closing velocity of the door 14, and the like. The multi-body dynamics analysis condition setting unit 22 may set a load, displacement, and the like obtained as a result of performing, beforehand, multi-body dynamics analysis on the structural body model 13.

Optimum Shape Analyzing Unit

Figure 8:
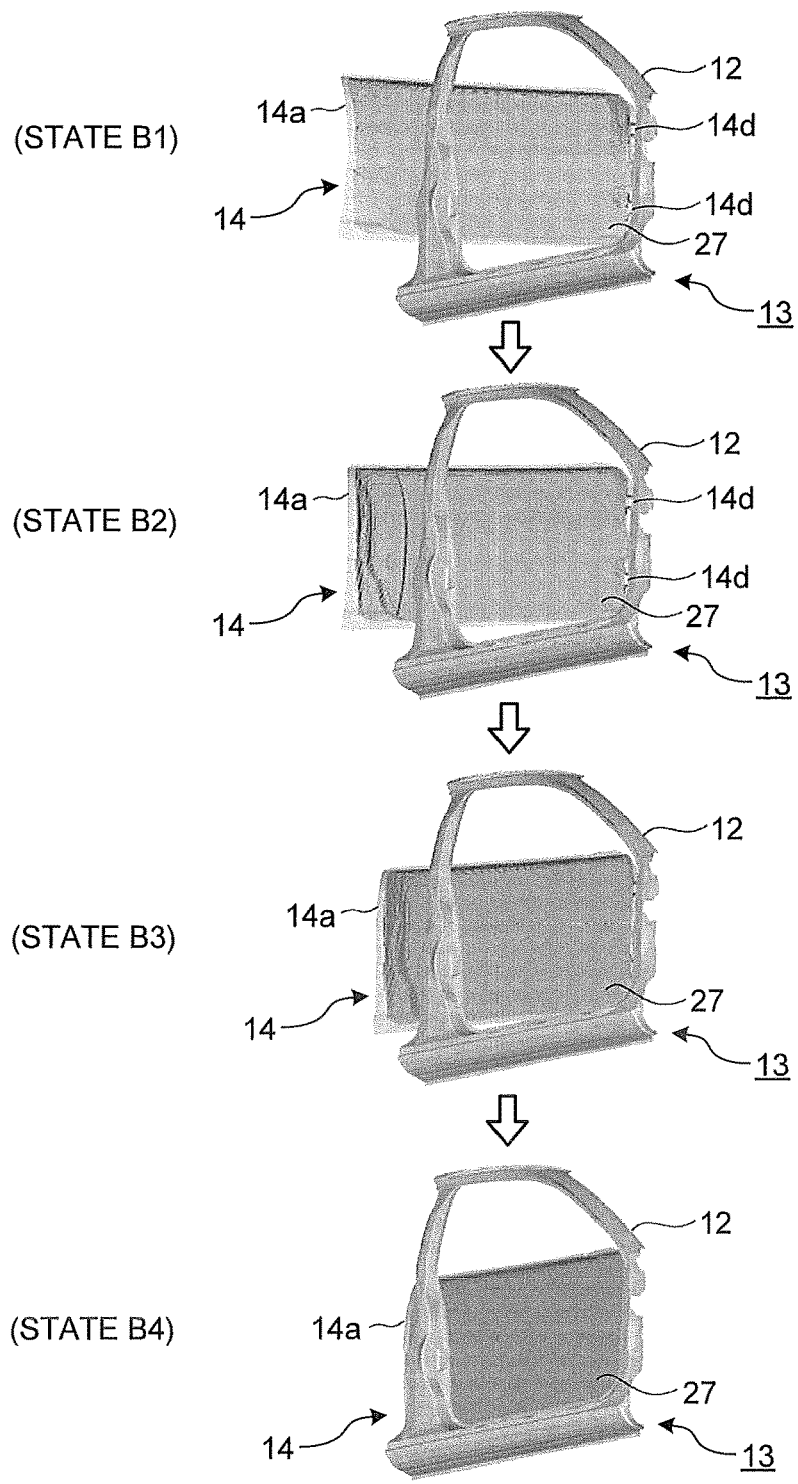
FIG. 8 is an explanatory diagram illustrating multi-body dynamics analysis conditions according to the first example and is an explanatory diagram illustrating an operation of closing the door.

The optimum shape analyzing unit 23 finds an optimum shape of the optimization block model 27 by executing multi-body dynamics analysis based on the set multi-body dynamics analysis condition and executing optimization analysis based on the optimization analysis condition. FIG. 8 is an explanatory diagram illustrating the multi-body dynamics analysis condition according to the first example and is an explanatory diagram illustrating an operation of closing the door 14. In FIG. 8, a state B1 illustrates an open state of the door 14. The state B2 and state B3 illustrate a process of the door 14 being brought from the open state into a closed state. The state B4 illustrates the closed state of the door 14.

When the optimum shape analyzing unit 23 starts analysis, the door rotates about the hinge portion 14d (see the state B1 to state B3 illustrated in FIG. 8), and the outer part 14a collides with the door frame 12 as the door 14 is closed (see the state B4 illustrated in FIG. 8). When the door 14 starts rotation, a centrifugal force acts on the optimization block model 27. When the door 14 is closed and the door frame 12 collides with the outer part 14a, a reaction force is generated, and the reaction force is transmitted to and acts on the optimization block model 27 from the outer part 14a via the connected portion 29 (see FIG. 6). Further, when this happens, negative acceleration is instantaneously caused on the optimization block model 27. Therefore, an inertia force according to mass acts on the optimization block model 27. As described above, the above described three forces (centrifugal force, reaction force, inertia force) act on the optimization block model 27.

The optimum shape analyzing unit 23 preferably performs discretization of an optimization parameter in optimization calculation by numerical analysis, that is, in optimization analysis. Preferably, a penalty coefficient in this discretization is equal to or greater than "2", or limitation is made to three to twenty times the size of the three-dimensional element that becomes a reference. By performing discretization of the optimization parameter, the optimization parameter is able to be reflected in the structural body shape of the thin sheet. The optimum shape analyzing unit 23 may perform optimization calculation by topology optimization, that is, topology optimization processing, or optimization processing by any other optimization calculation method. Therefore, as the optimum shape analyzing unit 23, commercially available analysis software using finite elements, for example, may be used. By the optimum shape analyzing unit 23 executing optimization analysis processing, among the three-dimensional elements in the optimization block model 27, three-dimensional elements, which have an optimum shape satisfying given analysis conditions, remain.

It should be noted that, as described above, analysis is able to be performed by load transmission similar to load transmission caused in the actual automotive body, which is a reaction force being generated when the door frame 12 collides with the outer part 14a and the reaction force being transmitted to the optimization block model 27 from the outer part 14a via the connected portion 29.

This point will be described in detail with a comparative example.

Figure 9:
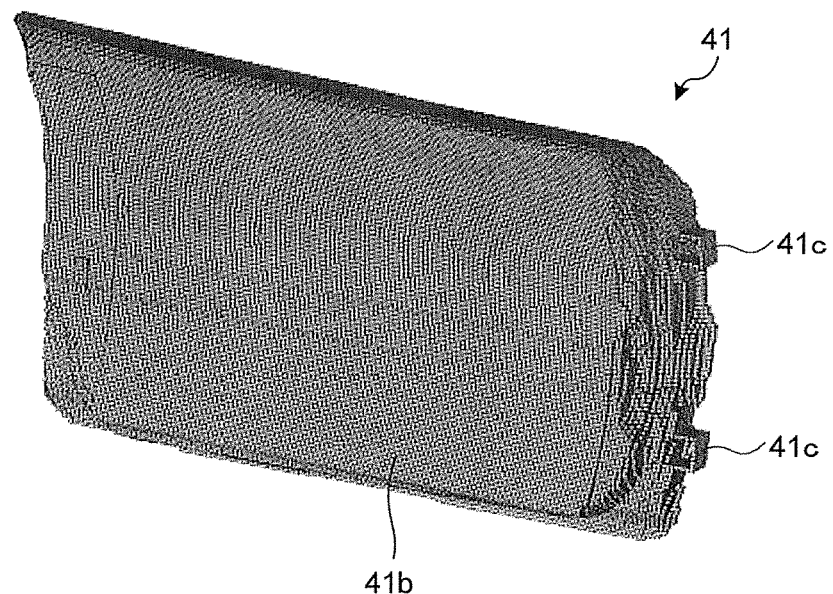
FIG. 9 is an explanatory diagram illustrating a model of a door alone as a comparative example of the movable portion (door) of the structural body model according to the first example.
Figure 10:
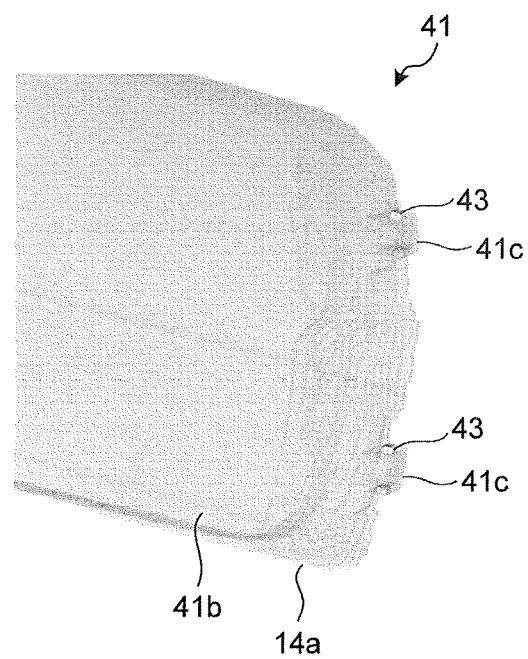
FIG. 10 is an explanatory diagram illustrating multi-body dynamics analysis conditions of the comparative example.

FIG. 9 is an explanatory diagram of a model of a door alone, as a comparative example of the door, which is one example of the movable portion of the structural body model according to the first example. FIG. 9 illustrates, as the model of this comparative example, a door model 41 corresponding to a portion of the door 14 other than the outer part 14a (for example, an inner part 41b and a hinge portion 41c). FIG. 10 is an explanatory diagram illustrating a multi-body dynamics analysis condition of the comparative example. In this comparative example, multi-body dynamics analysis and optimization analysis were performed with respect to this door model 41. Specifically, in the optimization analysis of the comparative example, a shape that minimizes displacement of an attachment surface was found, supposing that the outer part 14a is attached to the door model 41. In the multi-body dynamics analysis of the comparative example, analysis was performed with respect to an operation corresponding to an operation of closing the door, which is instantly stopping the door model 41 after the door model 41 is caused to rotate about a shaft 43 of the hinge portion 41c illustrated in FIG. 10 at a predetermined velocity by a predetermined angle. In this operation, the comparative example is similar in that a centrifugal force in the rotation and an inertia force upon the stop of the rotation act on the door model 41, but since the door frame 12 is not used in the comparative example, the phenomenon of the outer part 14a colliding with the door frame 12 is not able to be considered. Further, since the comparative example does not have the outer part 14a, a property such as stiffness, that the outer part 14a itself has, is not able to be considered.

As a result, between when the multi-body dynamics analysis was performed by setting the above described optimization block model 27 to the door frame 12 and the case of the above described comparative example (when the multi-body dynamics analysis is performed without setting the door model 41 to the door frame 12), optimum shapes entirely different from each other were obtained. Such different shapes result in different improvements in their stiffness, for example. Therefore, I enable an optimum shape, which is practically usable, to be found, not only by simply constraining the optimization block model 27 but also causing a load to be transmitted, through connecting of the optimization block model 27 to the structural body model 13. This point will be described in detail in later described examples.

Figure 11:
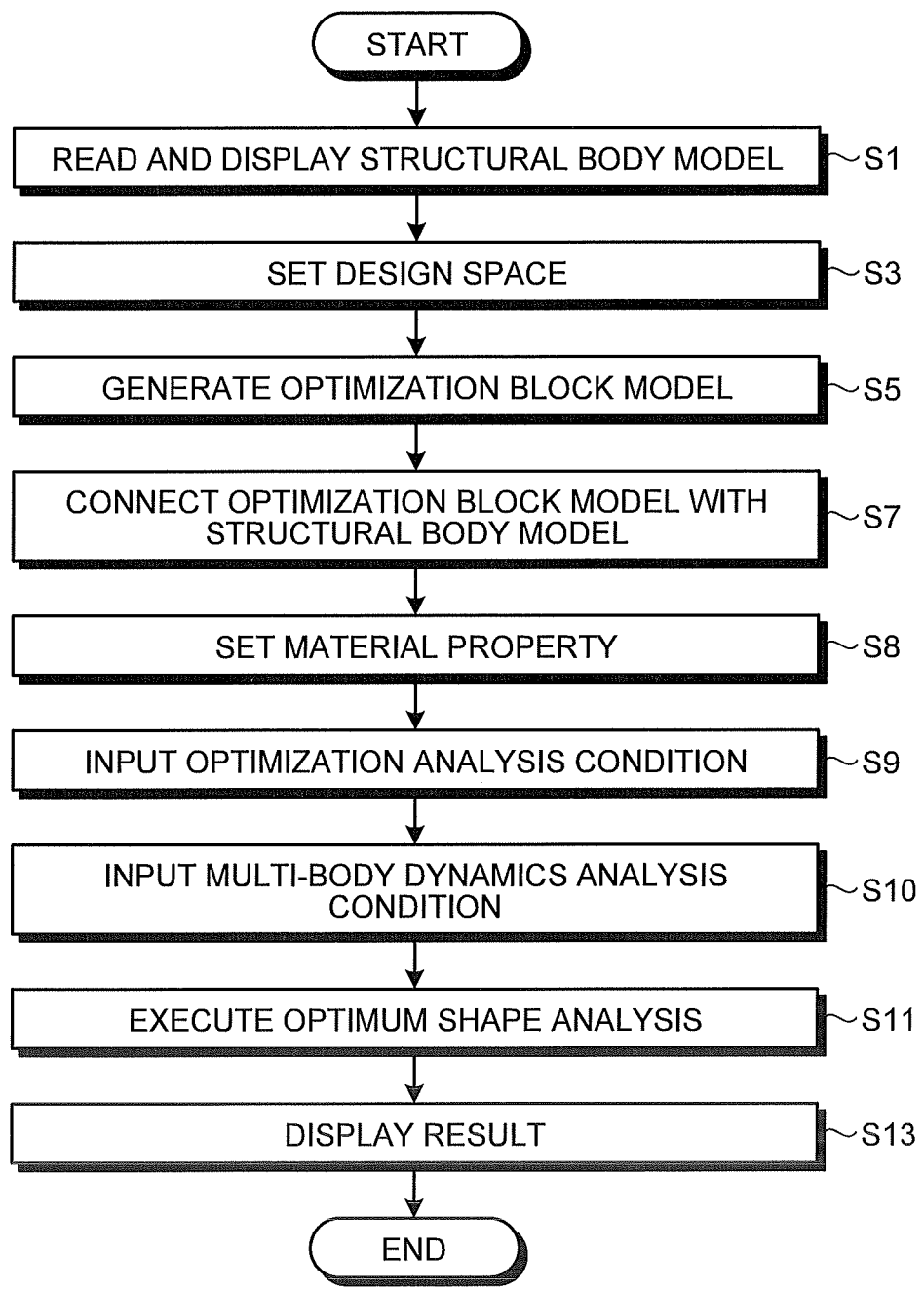
FIG. 11 is a flow chart illustrating a flow of a process of the method for analysis of shape optimization according to the first example.

Next, a flow of a process upon actual execution of analysis by using the device for analysis of shape optimization 1 configured as described above will be described based on a flow chart illustrated in FIG. 11. The process described below is realized by a computer executing, as appropriate, each of the above described processes of the respective functional units (the design space setting unit 15, the optimization block model generating unit 17, the connection processing unit 19, the material property setting unit 20, the optimization analysis condition setting unit 21, the multi-body dynamics analysis condition setting unit 22, and optimum shape analyzing unit 23) of the arithmetic processing unit 11 by an operator instructing the computer via the input device 5.

By the operator instructing, with the input device 5, a file of the structural body model 13 to be read, the computer reads the structural body model 13 from the memory storage 7 and displays the structural body model 13 on the display device 3 (S1). Next, the operator sets, in the displayed structural body model 13, the design space 25 to be subjected to optimization processing. Specifically, the operator specifies coordinates of a part to be the design space 25 in the structural body model 13 and instructs elements of that part to be deleted. By this instruction, the design space setting unit 15 of the computer performs a process of deleting the elements of the part to set the design space 25 (S3).

When the design space 25 has been set, the operator instructs the optimization block model generating unit 17 to generate the optimization block model 27 of a size that fits in the design space 25. This instruction includes an instruction on which plane in the design space 25 the optimization block model 27 is to be generated based on. For example, if the optimization block model 27 illustrated in FIG. 4B and FIG. 5A is to be generated, when an instruction to generate the optimization block model 27 with reference to a plane in the front-back direction in the optimization block model 27 is given, the optimization block model generating unit 17 of the computer generates the optimization block model 27 that is meshed, by the optimization block model generating unit 17 of the computer pushing out the plane in the automobile's width direction (S5).

When the optimization block model 27 has been generated, the operator instructs the optimization block model 27 to be connected with the structural body model 13. This instruction includes which element of a rigid body element, a sheet element, or a beam element is to be used as a connection element. Upon receipt of the instruction, the connection processing unit 19 of the computer performs a process of connecting the optimization block model 27 with the structural body model 13 (S7).

When the above described connecting process is completed, the operator sets material properties of the optimization block model 27 (S8). Upon this setting, the operator performs input operations on the input device 5 to input material properties such as a Young's modulus, a specific gravity, a yield strength, and a tensile strength. The material property setting unit 20 of the computer sets the input material properties to the optimization block model 27 that has been connected with the structural body model 13 as described above.

Thereafter, the operator sets optimization analysis conditions (S9). Upon this setting, the operator inputs, as the optimization analysis conditions, as described above, an objective condition such as minimizing the strain energy or maximizing the absorbed energy, and a constraint condition such as a material volume fraction. Next, the operator inputs a multi-body dynamics analysis condition that performs multi-body dynamics analysis on the structural body model 13, with which the optimization block model 27 has been connected, and based on the input multi-body dynamics analysis condition, the multi-body dynamics analysis condition setting unit 22 of the computer sets the multi-body dynamics analysis condition (S10).

Next, the optimum shape analyzing unit 23 of the computer executes calculation of the multi-body dynamics analysis and calculation of the optimization analysis, to execute optimum shape analysis (S11). Subsequently, the computer displays, on the display device 3, a state where the necessary elements have remained in the optimization block model 27 by the optimization calculation and the like, as the result of the optimum shape analysis (S13).

The operator generates a shape model obtained by the optimization calculation or the like and checks stiffness by other structural analysis calculation based on the model.

As described above, according to this first example, since the multi-body dynamics analysis is executed by setting the part to be optimized in the structural body model 13 as the design space 25, generating the optimization block model 27 in the set design space 25, and connecting the optimization block model 27 with the structural body model 13, load transmission from the connected portion 29 with the structural body model 13 to the optimization block model 27 is appropriately achieved and the optimum shape of the optimization block model 27 is able to be accurately calculated.

As a result, optimization of an automotive body structure, for example, is enabled, stiffness and crash worthiness are able to be improved, and weight reduction of a structural body such as an automotive body, is able to be realized, while maintaining stiffness and crash worthiness of a movable portion exemplified by a door of the automotive body.

Figure 12A:
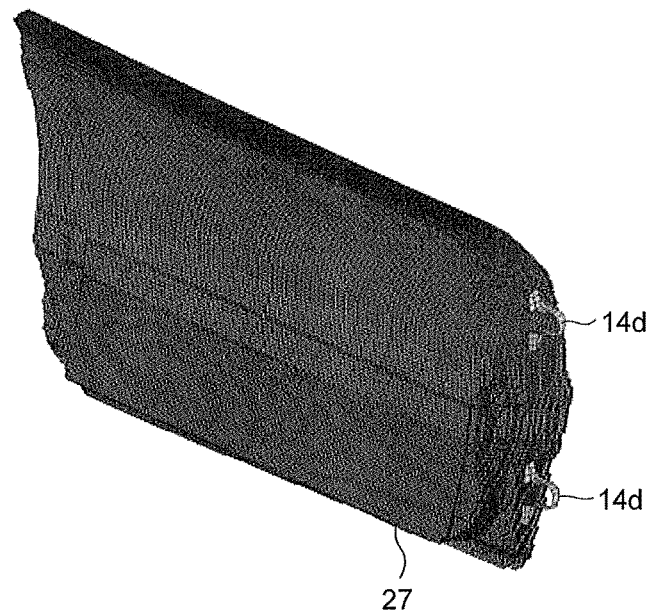
FIG. 12A is an explanatory diagram illustrating appearance of inside of another mode of the optimization block model of the movable portion (door) of the structural body model according to the first example.
Figure 12B:
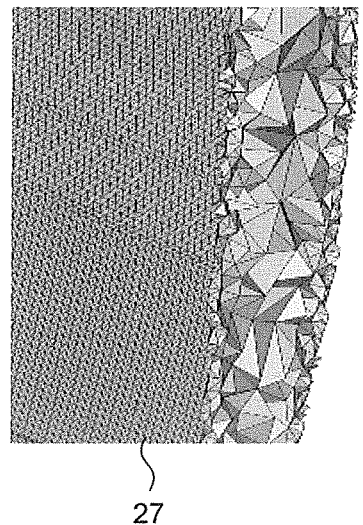
FIG. 12B is an enlarged view illustrating appearance of the inside of the optimization block model illustrated in FIG. 12A.

In the above description, a hexahedron as illustrated in FIG. 5B has been exemplified as a three-dimensional element forming the optimization block model 27, and it has been described that the optimization block model 27 is preferably formed of three-dimensional elements, as other three-dimensional elements, each of which is a polyhedron having five or more sides and eight or less sides and each of which has at least one pair of sides parallel to each other. However, my methods and devices do not exclude when a tetrahedron as illustrated in FIG. 12A and FIG. 12B is used as a three-dimensional element forming the optimization block model 27. FIG. 12A and FIG. 12B are explanatory diagrams illustrating appearance of inside of another mode of the optimization block model of the door, as an example of the movable portion of the structural body model according to the first example. FIG. 12A is a diagram illustrating an example of the other mode of the optimization block model according to the first example. FIG. 12B is an enlarged view illustrating enlarged appearance of inside of the optimization block model illustrated in FIG. 12A at its front-back direction central portion. If a tetrahedral element is used as a three-dimensional element forming the optimization block model 27 as illustrated in FIG. 12A and FIG. 12B, model generation is possible by generating only an external form of the design space 25 and automatically filling in the inside thereof. However, since the shape of the three-dimensional element becomes a shape having a sharp point at a part where tips of three sides formed of triangles, there is a problem that the optimization block model 27 is difficult to be reflected in the structural body of the thin sheet.

FIG. 12B illustrates enlarged appearance of inside of the optimization block model 27 illustrated in FIG. 12A at its front-back direction central portion. The optimization block model 27 illustrated in FIG. 12A has been generated, as illustrated in FIG. 12B such that the element size gradually becomes larger from the surface to the inside. The optimization block model 27 may be generated such that the inside element size is made finer according to the surface element size and the optimization block model 27 as a whole has a uniform element size. In this case, accurate analysis becomes possible.

Figure 13A:
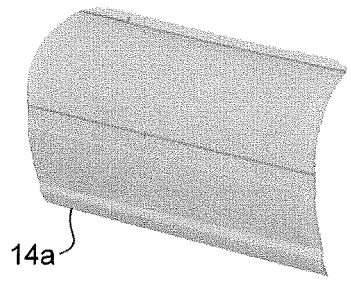
FIG. 13A is a diagram illustrating an example of a portion other than a design space in the movable portion of the structural body model according to the first example.
Figure 13B:
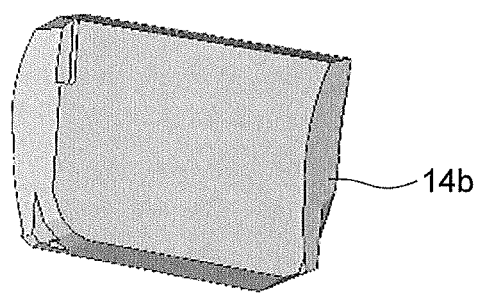
FIG. 13B is a diagram illustrating another example of the portion other than the design space in the movable portion of the structural body model according to the first example.
Figure 13C:
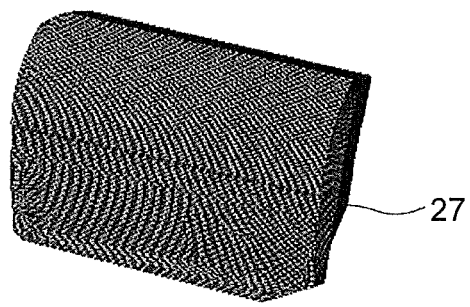
FIG. 13C is a diagram illustrating another mode of the optimization block model according to the first example.
Figure 13D:
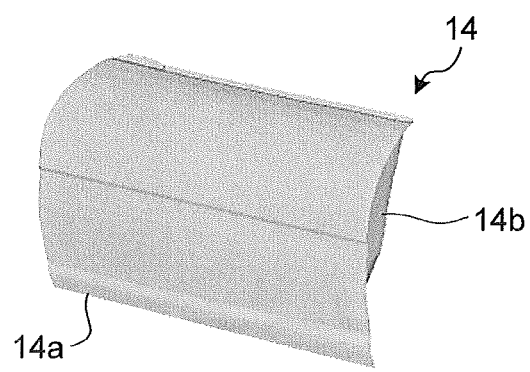
FIG. 13D is a diagram illustrating another mode of a connected body of the structural body model and optimization block model according to the first example.
Figure 14:
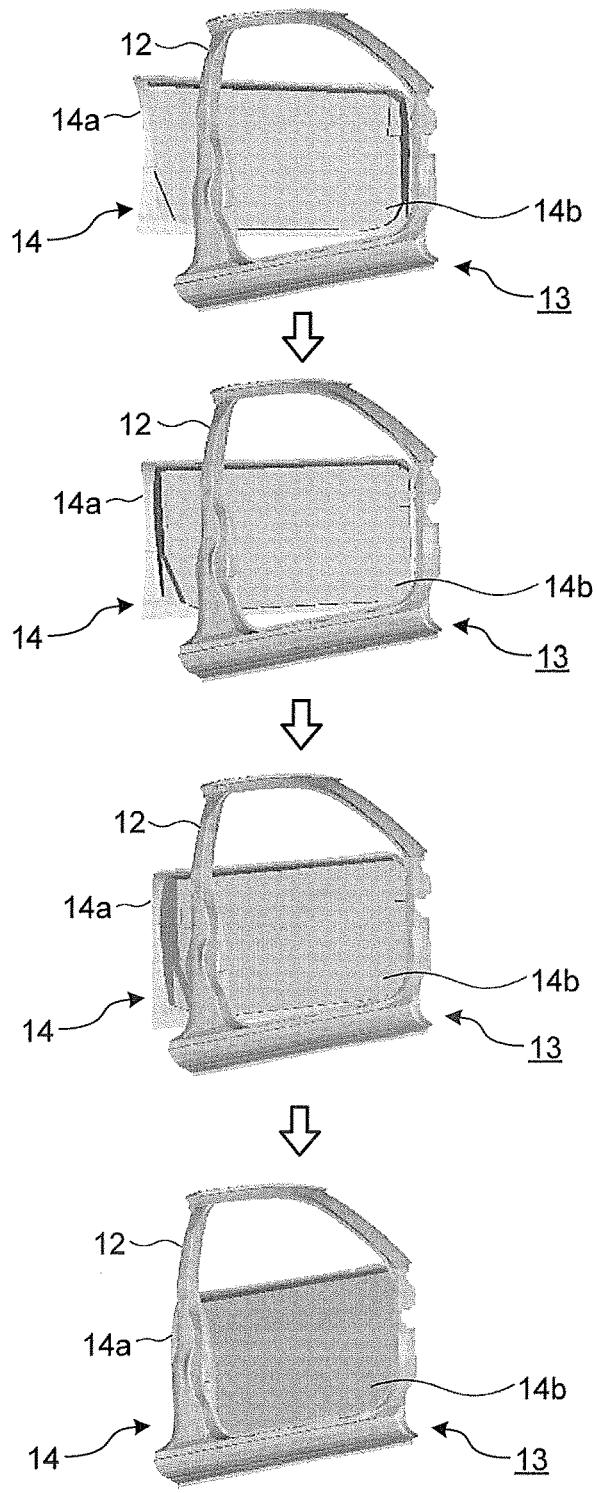
FIG. 14 is an explanatory diagram illustrating optimization analysis for the door illustrated in FIG. 13.

According to the above description, the inner part 14b has been set as the design space 25, but the method of setting the design space 25 is not limited thereto. FIG. 13A to FIG. 13D are explanatory diagrams illustrating another mode of a design space of a door, as an example of the movable portion of the structural body model according to the first example. FIG. 13A is a diagram illustrating an example of a portion of this movable portion, other than the design space. FIG. 13B is a diagram illustrating another example of a portion of this movable portion, other than the design space. FIG. 13C is a diagram illustrating another mode of the optimization block model according to the first example. FIG. 13D is a diagram illustrating another mode of a connected body of the structural body model and the optimization block model according to the first example. For example, the design space 25 may be set in a portion other than the outer part 14a illustrated in FIG. 13A and the inner part 14b illustrated in FIG. 13B. In that case, as compared to FIG. 4B, only a portion other than the inner part 14b is generated as the optimization block model 27 (see FIG. 13C). A component (corresponding to the door 14) obtained by connecting the outer part 14*a*, the inner part 14*b*, and the optimization block model 27 is illustrated in FIG. 13D. In this case, when optimum shape analysis similar to that in the above described when the portion other than the outer part 14*a* is set as the design space 25 is executed (see FIG. 14), a shape that has been optimized remains inside the inner part 14*b*. By doing that, how the inner part 14*b* is to be reinforced is able to known. Further, if the design space 25 is set in the portion other than the outer part 14*a* and inner part 14*b* as described above, as compared to the above described case when the portion other than the outer part 14*a* is set as the design space 25, accurate analysis becomes possible by changing the optimization analysis conditions. For example, since there is the inner part 14*b*, the material volume fraction of the portion other than the inner part 14*b* may be decreased.

In the above described example, although an example in which optimization is performed on the door 14 (front door) at the front left of the automotive body has been described, my methods and devices are applicable to other movable portions. Examples of the other movable portions include, a rear door, a back door, and a trunk.

Second Example

This second example relates to another mode of the optimization block model generating unit 17, and generation of an optimization block model is performed by setting a node in a connected portion with the two-dimensional elements or three-dimensional elements forming the structural body model 13, using hexahedral three-dimensional elements as three-dimensional elements forming the optimization block model 27, and stacking the three-dimensional elements along a plane including the node set in the connected portion. Hereinafter, specific description will be made with reference to the drawings.

Figure 15:
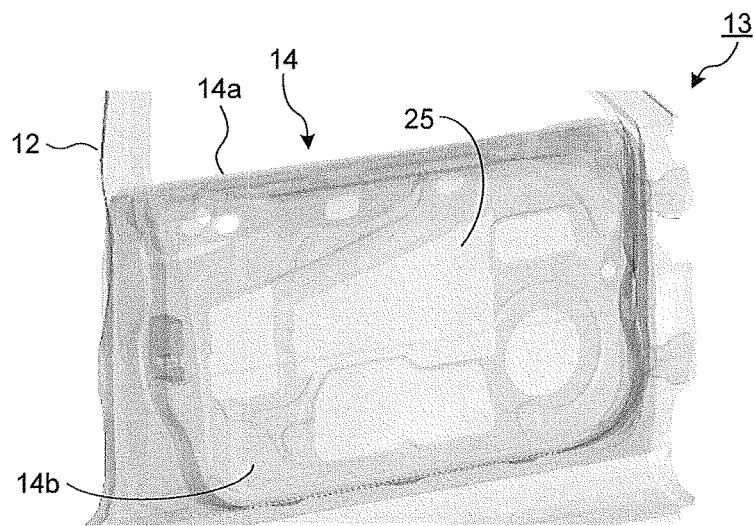
FIG. 15 is an explanatory diagram of a design space according to a second example.

FIG. 15 illustrates a state where the design space 25 has been set in a part of a space surrounded by the outer part 14*a* and the inner part 14*b*. In this example, what is not parallel with a reference axis plane exists at a connected position between the structural body model 13 formed of the two-dimensional elements as illustrated in FIG. 15 and the three-dimensional elements of the optimization block model 27 illustrated in later described FIG. 17. This second example is to be applied to such a case.

Figure 16:
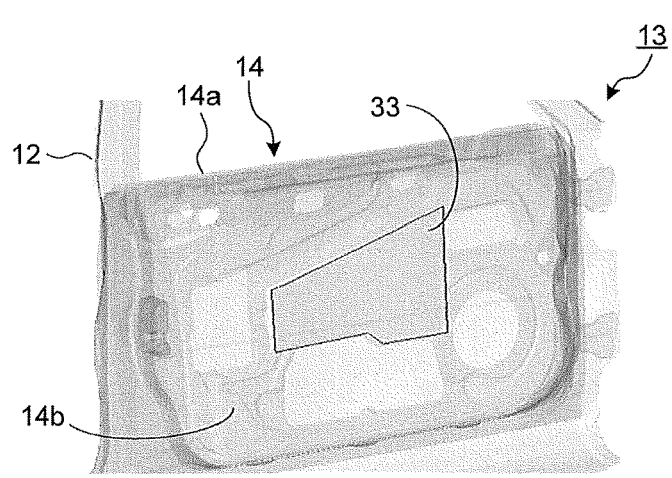
FIG. 16 is an explanatory diagram of a method of generating an optimization block model according to the second example.

In this second example, the optimization block model generating unit 17 also has an optimization block model generating function described below, in addition to the above described optimization block model generating function according to the first example. Specifically, the optimization block model generating unit 17 generates, as illustrated in FIG. 16, a reference plane 33 that becomes a reference for generating the optimization block model 27, with a sheet element, by connecting with straight lines nodes present at a part where the structural body model 13 has been deleted, on a plane in the design space 25 at an inner part 14*b* side thereof. When the reference plane 33 has been generated, the optimization block model generating unit 17 generates the optimization block model 27 by pushing out the reference plane 33 in the automobile's width direction to be integrated by node sharing.

Figure 17:
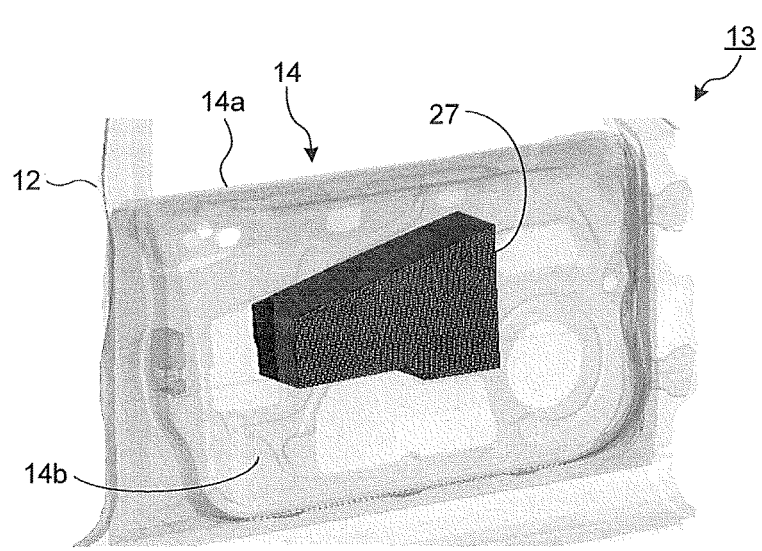
FIG. 17 is an explanatory diagram of the optimization block model generated according to the second example.
Figure 18:
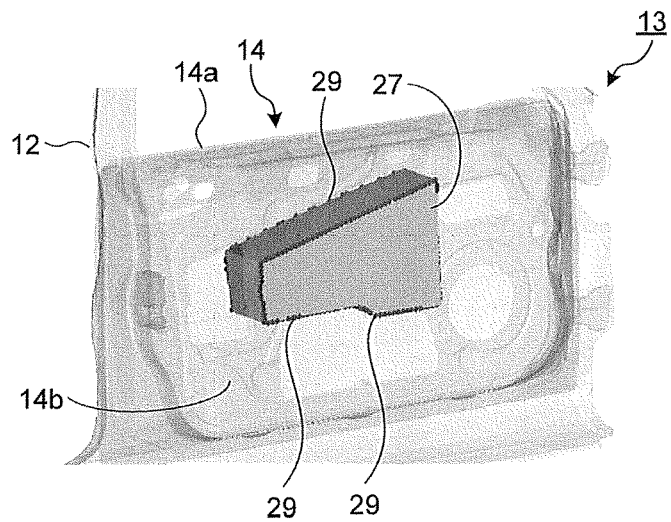
FIG. 18 is a diagram illustrating a connected portion of the optimization block model generated according to the second example.

A state where the optimization block model 27 according to the second example has been generated is illustrated in FIG. 17 and FIG. 18. FIG. 17 illustrates a state of a mesh of the generated optimization block model 27. FIG. 18 illustrates the connected portion 29 in the optimization block model 27. As described above, the optimization block model generating unit 17 generates the reference plane 33 (see FIG. 16) and generates the optimization block model 27 by using this reference plane 33. Thereby, there is an effect that a slanted part of the connected portion 29 between the optimization block model 27 and the structural body model 13 becomes smoothly straight-lined. Accordingly, a connected state between the optimization block model 27 and the structural body model 13 becomes smooth, and as a result, an effect of load transmission between the optimization block model 27 and the structural body model 13 becoming accurate is achieved.

Figure 19:
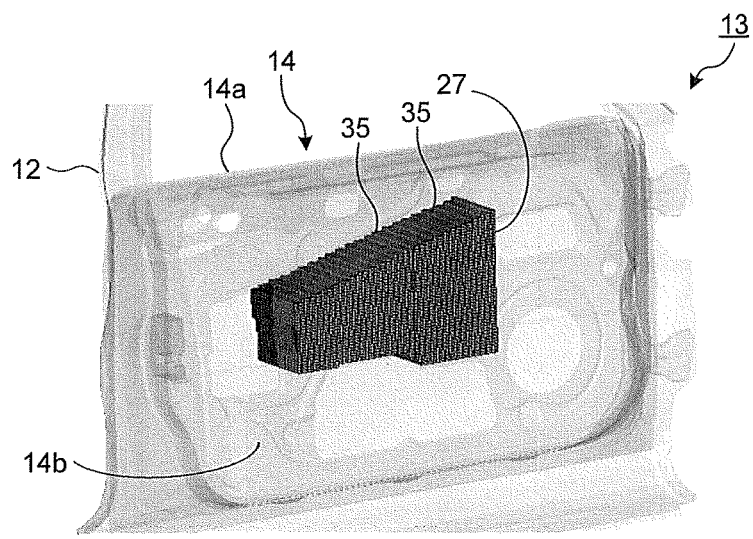
FIG. 19 is an explanatory diagram of a state where the optimization block model has been generated by the method of the first example as a comparative example for the method of generating the optimization block model according to the second example.
Figure 20:
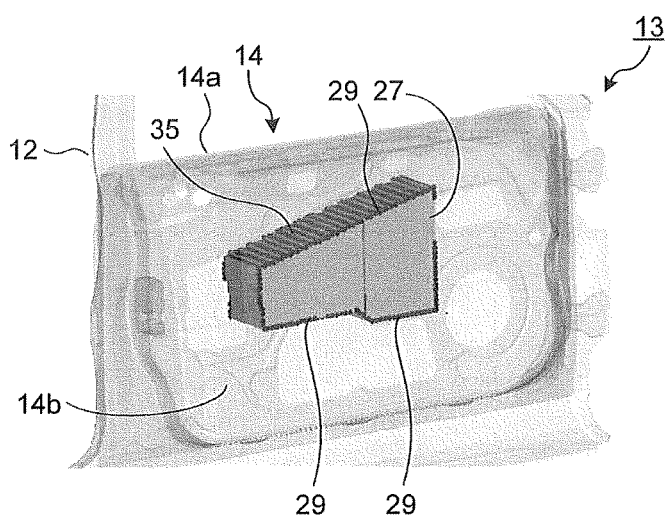
FIG. 20 is a diagram illustrating a connected portion of the optimization block model of the comparative example with respect to the second example.

As a comparative example with respect to this second example, an example in which the optimization block model 27 has been generated, similarly to the first example, without generating the reference plane 33 beforehand, is illustrated in FIG. 19 and FIG. 20. FIG. 19 is a diagram illustrating a state of a mesh of the optimization block model 27 generated in the comparative example. FIG. 20 illustrates the connected portion 29 in the optimization block model 27 according to the comparative example. In the comparative example illustrated in FIG. 19 and FIG. 20, as compared with the optimization block model 27 according to this second example illustrated in FIG. 17, steps 35 are found to be formed in the slanted part, and the connected portion 29 of the comparative example is found to be not smooth.

According to this second example, even if the optimization block model 27 is shaped to have a slope, a connected state between the optimization block model 27 and the structural body model 13 becomes smooth, and as a result, load transmission between the optimization block model 27 and the structural body model 13 becomes accurate.

Third Example

In the above described first and second examples, as the process of generating the optimization block model 27 by the optimization block model generating unit 17, the example in which the optimization block model 27 has been generated with a single body has been described, but in this third example, the optimization block model generating unit 17 may form the optimization block model 27 with a plurality of blocks formed of three-dimensional elements and generate the optimization block model 27 by connecting these plurality of blocks by using a rigid body element, a beam element, or a two-dimensional element. Hereinafter, a process of generating the optimization block model 27 according to the third example will be described specifically.

Figure 21:
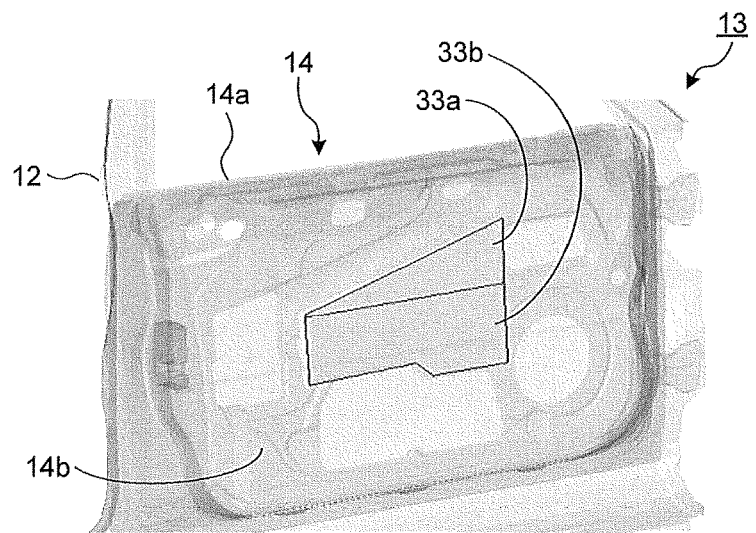
FIG. 21 is an explanatory diagram of a method of generating an optimization block model according to a third example.
Figure 22A:
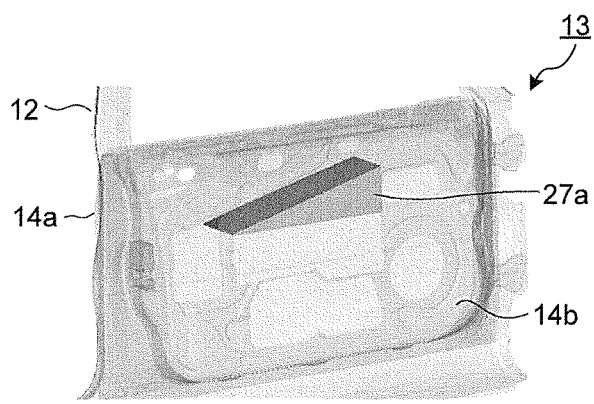
FIG. 22A is a diagram illustrating a state where an upper portion of the optimization block model according to the third example has been generated.
Figure 22B:
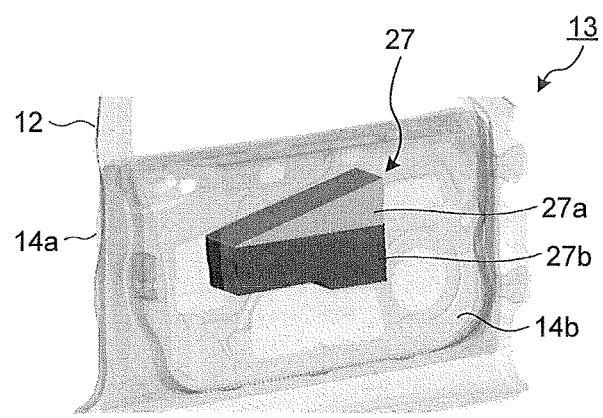
FIG. 22B is a diagram illustrating a state where a lower portion of the optimization block model according to the third example has been generated.
Figure 22C:
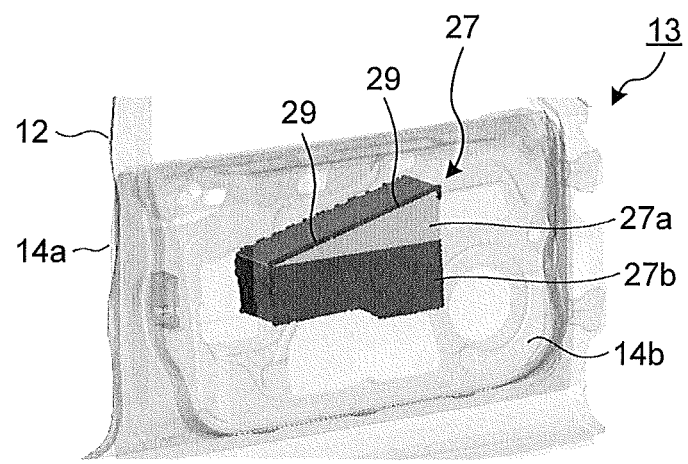
FIG. 22C is a diagram illustrating a state where the optimization block model according to the third example has been connected with a structural body model.

FIG. 21 and FIG. 22A to FIG. 22C are explanatory diagrams of a method of generating an optimization block model according to this third example. FIG. 22A is a diagram illustrating a state where an upper portion of the optimization block model according to the third example has been generated. FIG. 22B is a diagram illustrating a state where a lower portion of the optimization block model according to the third example has been generated. FIG. 22C is a diagram illustrating a state where the optimization block model according to the third example has been connected with a structural body model. The optimization block model generating unit 17 also has an optimization block model generating function according to this third example, in addition to the above described optimization block model generating functions according to the first and second examples. In this third example, the optimization block model generating unit 17 uses the method of generating the reference plane 33 described in the second example and generates the optimization block model 27 with a plurality of blocks.

Specifically, the optimization block model generating unit 17 generates a plurality of independent reference planes 33*a* and 33*b* first in the design space 25 illustrated in FIG. 15 (see FIG. 21). Next, the optimization block model generating unit 17 pushes out the upper and triangular reference plane 33*a* illustrated in FIG. 21 in the automobile's width direction to generate an upper block 27*a* as illustrated in FIG. 22A, which is a triangular prism portion. Subsequently, the optimization block model generating unit 17 pushes out the reference plane 33*b* (see FIG. 21) below the triangular prism, in the automobile's width direction, to generate a lower block 27*b* as illustrated in FIG. 22B. Thereafter, the optimization block model generating unit 17 sequentially connects, with the connected portion 29, the generated blocks together, as well as the optimization block model 27 and the structural body model 13 (automotive body) together, the optimization block model 27 being a connected body of these upper block 27*a* and lower block 27*b* (see FIG. 22C).

As described above, in this third example, by generating the optimization block model 27 through division into a plurality of blocks, the optimization block model 27 is able to be generated, not only in the design space 25 formed of a block of a simple shape such as a cuboid, but also in the design space 25, which is not of a simple shape, for example, the design space 25 formed of a block of a complex shape or a block including a slope.

Further, by generating the optimization block model 27 through division into a plurality of blocks, the optimization block model 27 is able to be formed with a smooth surface. Thereby, the connection between the optimization block model 27 and the structural body model 13 is able to be made smooth and as a result, load transmission between the optimization block model 27 and the structural body model 13 is able to be achieved accurately.

In the above described third example, any of the upper block 27*a* and lower block 27*b* may be generated first, and the order of the connection between these blocks (the upper block 27*a* and the lower block 27*b*) and the connection between the upper block 27*a* or lower block 27*b* with the automotive body is not particularly limited and any of these connections may be performed first.

Further, in this third example, since optimization basically targets a space where nodes are shared, connection of blocks is preferably performed such that the connected area is equal to or less than 20%.

INDUSTRIAL APPLICABILITY

As described above, a method and a device for analysis of shape optimization are useful for optimization of a structural body such as an automotive body, and in particular are suitable for a method and a device for analysis of shape optimization that realize both improvement in stiffness and crash worthiness of a movable part of the structural body and weight reduction of the structural body.

The invention claimed is:

1. A method for analysis of shape optimization comprising optimizing a part of a structural body model including a movable portion, by combining a multi-body dynamics analysis and an optimization analysis and using two-dimensional elements or three-dimensional elements, the optimizing includes:

a design space setting step of setting, as a design space, a portion to be optimized in the movable portion;

an optimization block model generating step of generating, in the set design space, an optimization block model formed of three-dimensional elements and is to be subjected to analysis processing of optimization;

a connection processing step of connecting the generated optimization block model with the structural body model including the movable portion;

a material property setting step of setting a material property for the optimization block model;

an optimization analysis condition setting step of setting an optimization analysis condition to determine an optimum shape of the optimization block model;

a multi-body dynamics analysis condition setting step of setting a multi-body dynamics analysis condition including a centrifugal force, a reaction force and an inertial force to perform multi-body dynamics analysis on the structural body model including the movable portion with which the optimization block model has been connected;

an optimum shape analyzing step of executing, based on the set multi-body dynamics analysis condition, the multi-body dynamics analysis on the structural body model including the movable portion incorporating the optimization block model; executing, based on the set optimization analysis condition, the optimization analysis; and finding the optimum shape of the optimization block model, and utilizing the analysis of shape optimization for configuring optimization of the movable portion of the structural body configured of a thin sheet; and displaying the structural body model including the moveable portion based on the optimum shape analyzing step;

wherein the optimization block model is generated by:

setting nodes in a portion connected with the two-dimensional elements or three-dimensional elements forming the structural body model; and stacking the three-dimensional elements along a plane including the nodes set in the connected portion.

2. The method for analysis of shape optimization according to claim 1, wherein, in the multi-body dynamics analysis condition setting step, a load or displacement that is obtained as a result of performing multi-body dynamics analysis on the structural body model beforehand is set.

3. The method for analysis of shape optimization according to claim 1, wherein, in the material property setting step, at a time a part where the optimization block model has been connected in the structural body model is formed of two-dimensional elements, a Young's modulus in the three-dimensional elements of the optimization block model is set lower than a Young's modulus in the two-dimensional elements.

4. The method for analysis of shape optimization according to claim 1, wherein the three-dimensional elements forming the optimization block model are each formed of a three-dimensional element that is a polyhedron having five to eight sides and that has at least one pair of sides parallel to each other.

5. The method for analysis of shape optimization according to claim 1, wherein the optimization block model is formed of a plurality of block bodies formed of three-dimensional elements, and is formed by connecting the plurality of block bodies by using a rigid body element, a beam element, or a two-dimensional element.

6. The method for analysis of shape optimization according to claim 1, wherein discretization is performed with an optimization parameter in optimization calculation by numerical analysis.

7. A device for analysis of shape optimization, for optimizing a part of a structural body model having a movable portion, by combining a multi-body dynamics analysis and an optimization analysis and using two-dimensional elements or three-dimensional elements, the device comprising a display device and a computer with a central processing unit and memory that:
sets, as a design space, a portion to be optimized in the movable portion;
generates, in the set design space, an optimization block model formed of three-dimensional elements and is subjected to analysis processing of optimization;
connects the generated optimization block model with the structural body model including the movable portion;
sets a material property for the optimization block model;
sets an optimization analysis condition to determine an optimum shape of the optimization block model;
sets a multi-body dynamics analysis condition including a centrifugal force, a reaction force and an inertial force to perform multi-body dynamics analysis on the structural body model including the movable portion with which the optimization block model has been connected;
executes, based on the set multi-body dynamics analysis condition, the multi-body dynamics analysis on the structural body model including the movable portion incorporating the optimization block model; executes, based on the set optimization analysis condition, the optimization analysis; and finds the optimum shape of the optimization block model, and
utilizes the analysis of shape optimization for configuring optimization of the movable portion of the structural body configured of a thin sheet;
wherein
the computer generates the optimization block model by:
setting nodes in a portion connected with the two-dimensional elements or three-dimensional elements forming the structural body model; and
stacking the three-dimensional elements along a plane including the nodes set in the connected portion, and
the display device displays the structural body model including the moveable portion based on the optimum shape.

8. The device for analysis of shape optimization according to claim 7, wherein the computer sets a load or displacement obtained as a result of performing multi-body dynamics analysis on the structural body model beforehand.

9. The device for analysis of shape optimization according to claim 7, wherein, at a time a part where the optimization block model has been connected in the structural body model is formed of two-dimensional elements, the computer sets a Young's modulus in the three-dimensional elements of the optimization block model lower than a Young's modulus in the two-dimensional elements.

10. The device for analysis of shape optimization according to claim 7, wherein the three-dimensional elements forming the optimization block model are each formed of a three-dimensional element that is a polyhedron having five to eight sides and that has at least one pair of sides parallel to each other.

11. The device for analysis of shape optimization according to claim 7, wherein the computer forms the optimization block model with a plurality of blocks formed of three-dimensional elements, and generates the optimization block model by connecting the plurality of blocks by using a rigid body element, a beam element, or a two-dimensional element.

12. The device for analysis of shape optimization according to claim 7, wherein the computer performs optimum shape analysis by discretization with an optimization parameter in optimization calculation by numerical analysis.

13. The device for analysis of shape optimization according to claim 7, wherein the computer performs optimum shape analysis by optimization calculation by topology optimization.

* * * * *